(12) United States Patent
Zeng et al.

(10) Patent No.: US 11,881,028 B2
(45) Date of Patent: Jan. 23, 2024

(54) VEHICLE LIDAR SYSTEM WITH NEURAL NETWORK-BASED DUAL DENSITY POINT CLOUD GENERATOR

(71) Applicant: GM Global Technology Operations LLC, Detroit, MI (US)

(72) Inventors: Shuqing Zeng, Sterling Heights, MI (US); Jordan Chipka, Commerce Township, MI (US); Yasen Hu, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 309 days.

(21) Appl. No.: 17/307,377

(22) Filed: May 4, 2021

(65) Prior Publication Data

US 2022/0358316 A1    Nov. 10, 2022

(51) Int. Cl.
    *G06V 20/00*      (2022.01)
    *G06V 20/56*      (2022.01)
    (Continued)

(52) U.S. Cl.
    CPC ............ *G06V 20/56* (2022.01); *B60R 99/00* (2013.01); *G01S 7/4802* (2013.01); *G01S 17/42* (2013.01);
    (Continued)

(58) Field of Classification Search
CPC ........ G06N 3/045; G06N 20/20; G06N 3/092; G06T 2207/20081; G06T 2207/20084; G06T 2207/10028; G06T 7/11; G06T 2207/30252; G06T 2207/30248; G06F 18/22; G06F 18/24; G06F 18/2413; G06F 18/21; G06F 16/35; G06V 10/82; G06V 20/56; G06V 20/58; G06V 10/764; G06V 10/25; G06V 20/588; G06V 10/759;
(Continued)

(56) References Cited

U.S. PATENT DOCUMENTS

| | | | |
|---|---|---|---|
| 10,345,447 B1 * | 7/2019 | Hicks | G01S 7/4863 |
| 2020/0005486 A1 * | 1/2020 | Sinha | G06T 7/337 |

FOREIGN PATENT DOCUMENTS

EP      3091333 A1 *    11/2016      ............. G01B 11/00

OTHER PUBLICATIONS

Shimizu et al, Space-variant Color Point Cloud Measurement System Enormous Data Reduction using Saliency Map, EEE 16th International Workshop on Advanced Motion Control (AMC), pp. 367-372 (Year: 2020).*

(Continued)

*Primary Examiner* — Ping Y Hsieh
*Assistant Examiner* — Xiao Liu
(74) *Attorney, Agent, or Firm* — CANTOR COLBURN LLP

(57) ABSTRACT

A vehicle system includes a lidar system that obtains an initial point cloud and obtains a dual density point cloud by implementing a first neural network and based on the initial point cloud. The dual density point cloud results from reducing point density of the initial point cloud outside a region of interest (ROI). Processing the dual density point cloud results in a detection result that indicates any objects in a field of view (FOV) of the lidar system. A controller obtains the detection result from the lidar system and controls an operation of the vehicle based on the detection result.

14 Claims, 4 Drawing Sheets

(51) Int. Cl.
*G06T 7/70* (2017.01)
*G01S 17/931* (2020.01)
*G01S 17/42* (2006.01)
*G01S 7/48* (2006.01)
*G06N 3/088* (2023.01)
*B60R 99/00* (2009.01)
*G06F 18/21* (2023.01)
*G06N 3/045* (2023.01)

(52) U.S. Cl.
CPC ............ *G01S 17/931* (2020.01); *G06F 18/21* (2023.01); *G06N 3/045* (2023.01); *G06N 3/088* (2013.01); *G06T 7/70* (2017.01); *G06T 2207/10028* (2013.01); *G06T 2207/20081* (2013.01); *G06T 2207/20084* (2013.01); *G06T 2207/30252* (2013.01)

(58) Field of Classification Search
CPC ...... G01S 17/931; G01S 17/42; G01S 7/4817; G01S 17/86; G01S 13/931; G01S 13/867; B60R 2300/607; B60W 2420/52
See application file for complete search history.

(56) References Cited

OTHER PUBLICATIONS

Shi et al, PointRCNN: 3D Object Proposal Generation and Detection from Point Cloud, Proceedings of the IEEE/CVF Conference on Computer Vision and Pattern Recognition (CVPR), pp. 770-779 (Year: 2019).*

Karim et al, RL-NCS: Reinforcement Learning Based Data-Driven Approach for Nonuniform Compressed Sensing, IEEE 29th International Workshop on Machine Learning for Signal Processing (MLSP) (Year: 2019).*

* cited by examiner

VEHICLE LIDAR SYSTEM WITH NEURAL NETWORK-BASED DUAL DENSITY POINT CLOUD GENERATOR

INTRODUCTION

The subject disclosure relates to a vehicle lidar system with a neural network-based dual density point cloud generator.

Vehicles (e.g., automobiles, trucks, construction equipment, farm equipment) increasingly rely on sensors to provide information about the vehicle and its environment. Exemplary types of sensors that provide information about the environment around the vehicle include a radio detection and ranging (radar) system, a light detection and ranging (lidar) system, and a camera. A lidar system provides a point cloud representation of features in the field of view of the lidar system. The detection of objects in the field of view is improved with an increased density of the point cloud but the processing time and complexity are also increased with density. Accordingly, it is desirable to provide a vehicle lidar system with a neural network-based dual density point cloud generator.

SUMMARY

In one exemplary embodiment, a vehicle system includes a lidar system to obtain an initial point cloud and to obtain a dual density point cloud by implementing a first neural network and based on the initial point cloud. The dual density point cloud results from reducing point density of the initial point cloud outside a region of interest (ROI). Processing the dual density point cloud results in a detection result that indicates any objects in a field of view (FOV) of the lidar system. A controller obtains the detection result from the lidar system and controls an operation of a vehicle based on the detection result.

In addition to one or more of the features described herein, the lidar system implements the first neural network to define the ROI within the FOV that results in the dual density point cloud, the ROI being a region of fixed area with a center that is selected from a set of potential centers based on an output of the first neural network.

In addition to one or more of the features described herein, the lidar system implements a second neural network to output the detection result based on the dual density point cloud.

In addition to one or more of the features described herein, the second neural network includes an encoder and decoder stage that provides point-wise feature vectors such that each feature vector of the point-wise feature vectors is associated respectively with each point of the dual density point cloud.

In addition to one or more of the features described herein, the first neural network is a Deep Q-Network (DQN) that obtains the point-wise feature vectors from the encoder and decoder stage of the second neural network.

In addition to one or more of the features described herein, training the DQN includes comparing the detection result obtained with the dual density point cloud with a ground truth detection result to produce a number of true positives and comparing a second detection result obtained by reducing the point density of the initial point cloud throughout the FOV with the ground truth detection result to produce a second number of true positives.

In addition to one or more of the features described herein, the training the DQN includes obtaining a reward by comparing the number of true positives with the second number of true positives, and the training the DQN includes maximizing the reward.

In addition to one or more of the features described herein, the DQN outputs a matrix indicating a predicted reward corresponding with each potential center among the set of potential centers.

In addition to one or more of the features described herein, the DQN outputs a matrix indicating a probability of a positive reward corresponding with each potential center among the set of potential centers.

In addition to one or more of the features described herein, the training the DQN includes obtaining a loss as a difference between the reward and a predicted reward provided by the DQN, and the training the DQN includes minimizing the loss.

In another exemplary embodiment, a method includes obtaining an initial point cloud and implementing a first neural network to obtain a dual density point cloud based on the initial point cloud. The dual density point cloud results from reducing point density of the initial point cloud outside a region of interest (ROI). The method also includes processing the dual density point cloud to obtain a detection result that indicates any objects in a field of view (FOV) of the lidar system.

In addition to one or more of the features described herein, the implementing the first neural network results in defining the ROI within the FOV that results in the dual density point cloud, the ROI being a region of fixed area with a center that is selected from a set of potential centers based on an output of the first neural network.

In addition to one or more of the features described herein, the method also includes implementing a second neural network to output the detection result based on the dual density point cloud.

In addition to one or more of the features described herein, the implementing the second neural network includes implementing an encoder and decoder stage to provide point-wise feature vectors such that each feature vector of the point-wise feature vectors is associated respectively with each point of the dual density point cloud.

In addition to one or more of the features described herein, the first neural network is a Deep Q-Network (DQN) and implementing the DQN includes obtaining the point-wise feature vectors from the encoder and decoder stage of the second neural network.

In addition to one or more of the features described herein, the method also includes training the DQN based on comparing the detection result obtained with the dual density point cloud with a ground truth detection result to produce a number of true positives and comparing a second detection result obtained by reducing the point density of the initial point cloud throughout the FOV with the ground truth detection result to produce a second number of true positives.

In addition to one or more of the features described herein, the training the DQN includes obtaining a reward by comparing the number of true positives with the second number of true positives, and the training the DQN includes maximizing the reward, and the training the DQN additionally includes obtaining a loss as a difference between the reward and a predicted reward provided by the DQN, and the training the DQN includes minimizing the loss.

In addition to one or more of the features described herein, the implementing the DQN includes outputting a matrix indicating a predicted reward corresponding with each potential center among the set of potential centers.

In addition to one or more of the features described herein, the implementing the DQN includes outputting a matrix indicating a probability of a positive reward corresponding with each potential center among the set of potential centers.

In addition to one or more of the features described herein, the method also includes a vehicle controller obtaining the detection result from the lidar system and controlling an operation of a vehicle based on the detection result.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
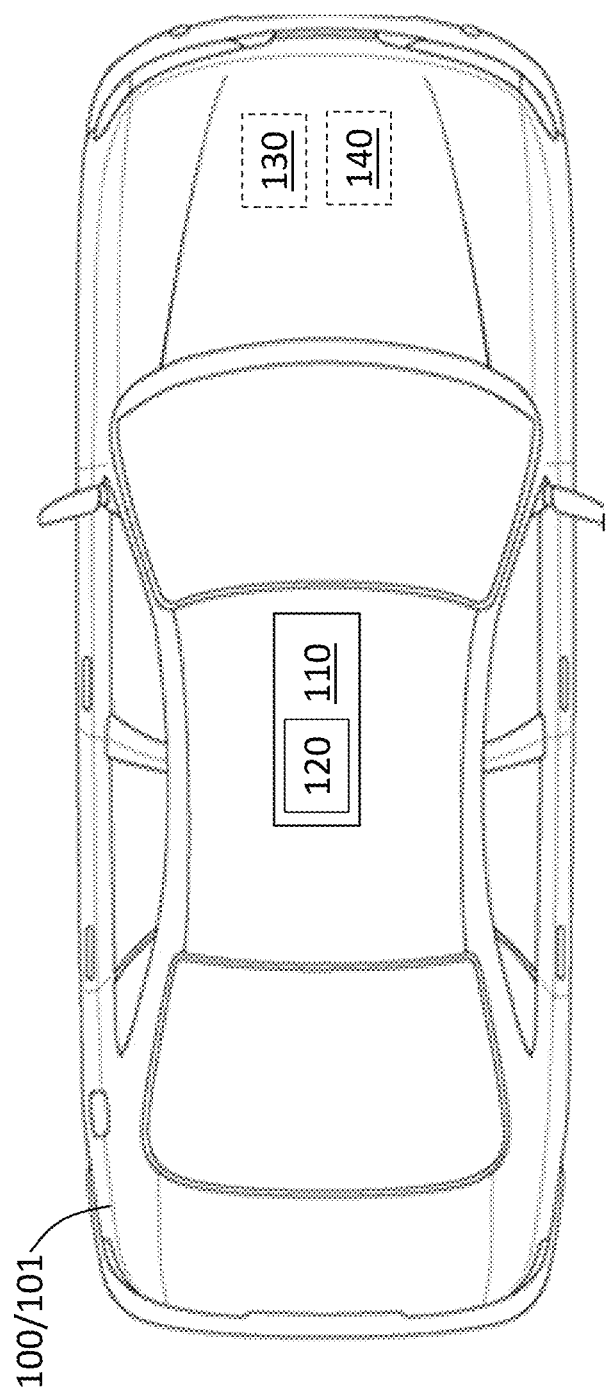
FIG. 1 is a block diagram of a vehicle with a neural network-based dual density point cloud generator according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a lidar system is one of the sensors used to obtain information about an environment around a vehicle. As also noted, the density of the point cloud obtained from the lidar system affects performance and processing time. Specifically, performance increases with an increase in the density of the point cloud, but so does processing time and bandwidth cost. Embodiments of the systems and methods detailed herein relate to a vehicle lidar system with a neural network-based dual density point cloud generator. The neural network is part of the lidar system rather than one that performs post-processing on an output point cloud from the lidar system.

A dual density point cloud refers to a point cloud with an area of lower density points and an area of higher density points. Specifically, the initially output point density is only retained for a portion of the field of view (FOV) that is of interest (i.e., the region of interest (ROI)). In other parts of the FOV, the density is decreased to a predetermined percentage. The predetermined percentage of original point density in non-ROI regions of the FOV is based on a recognition that detection performance does not increase, even though processing time does increase, by retaining points beyond the predetermined percentage of point density in the non-ROI region. The dual density approach facilitates having the higher processing time and bandwidth corresponding with higher performance only in the ROI and, thereby, decreasing the overall processing time and bandwidth requirement for the lidar system. For example, to emulate human vision, lower point cloud density (i.e., lower resolution) may be provided in peripheral areas of the field of view. As detailed, the size of the area of the ROI, in which point cloud density is relatively higher than in other areas of the FOV, may be fixed. The neural network is used to determine where, within the FOV, the ROI should be centered.

In accordance with an exemplary embodiment, FIG. 1 is a block diagram of a vehicle 100 with a neural network-based dual density point cloud generator. The exemplary vehicle 100 shown in FIG. 1 is an automobile 101. The vehicle 100 includes a lidar system 110 and may also include other sensors 130 (e.g., radar system, camera). The number and locations of the lidar system 110 and the number of other sensors 130 and their locations are not limited by the exemplary illustration in FIG. 1. The lidar system 110 includes a controller 120 that implements the neural network-based dual density point cloud generator according to one or more embodiments.

Figure 2:
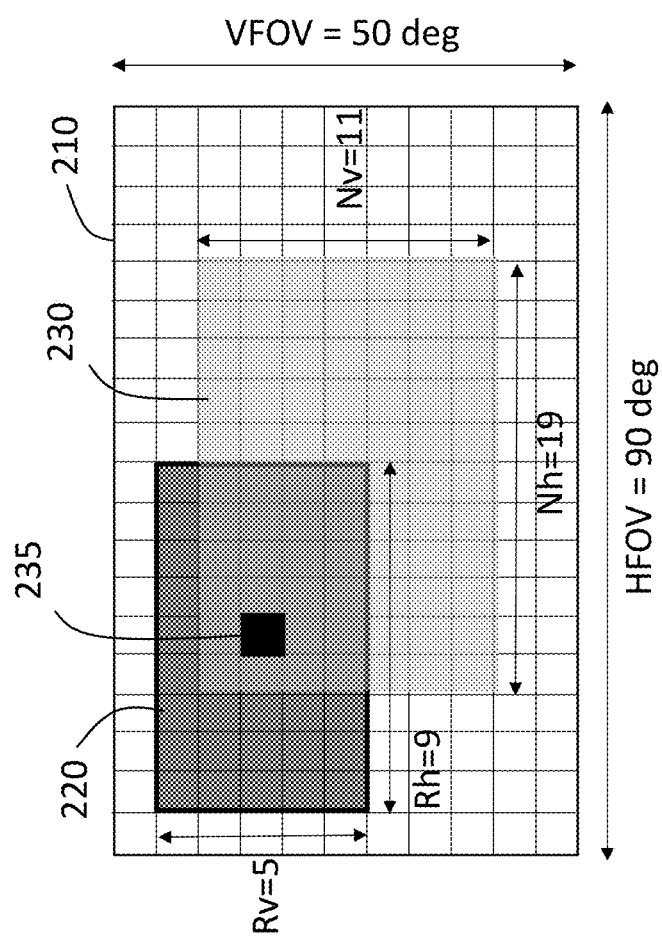
FIG. 2 illustrates an exemplary field of view with a neural network-based dual density point cloud according to one or more embodiments.

Specifically, the controller 120 of the lidar system 110 determines the location of the ROI 220 within the FOV 210, as shown in FIG. 2, by implementing a neural network. As previously noted, the higher density point cloud is maintained only within the ROI 220 and the dual density point cloud is generated by reducing the point density in areas of the FOV 210 outside the ROI 220. According to different exemplary embodiments, the neural network implemented by the controller 120 outputs different indicators of the ROI 220 location within the FOV 210.

The vehicle 100 includes a vehicle controller 140 that may obtain information from the lidar system 110 and other sensors 130 to control an aspect of autonomous or semi-autonomous operation of the vehicle 100. For example, semi-autonomous operation such as adaptive cruise control or automatic braking may be implemented by the vehicle controller 140 based on information from the lidar system 110 and/or other sensors 130. The controller 120 of the lidar system 110 and the vehicle controller 140 may both include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 illustrates an exemplary FOV 210 with a neural network-based dual density point cloud according to one or more embodiments. The FOV 210 of the lidar system 110 is shown discretized to a grid in FIG. 2. As indicated, a horizontal span of the FOV 210 (HFOV) is 90 degrees (deg) and a vertical span of the FOV 210 (VFOV) is 50 deg. An exemplary ROI 220 is shown in FIG. 2. Based on the exemplary grid, the horizontal grid span of the ROI 220 (Rh) is 9 grid units and a vertical grid span of the ROI 220 (Rv) is 5 grid units. The center 235 of the exemplary ROI 220 is labeled. The center 235 is part of a set of potential centers 230, which is a subset of all the units of the grid representing the FOV 210 that could act as the center 235 of the ROI 220 based on the fixed size (i.e., Rh and Rv) of the ROI 220.

That is, selecting a different center 235 from among the set of potential centers 230 would result in a shift of the ROI 220 within the FOV 210. The units of the grid representation of the full FOV 210 that make up the set of potential centers 230 is limited by the fixed area of the ROI 220. That is, the set of potential centers 230 is selected such that an ROI 220 centered at any one of the set of potential centers 230 will not fall outside the FOV 210. According to one or more embodiments and as detailed herein, a neural network is implemented by the controller 120 of the lidar system 110 to select the center 235 from among the set of potential centers 230 and thereby define a location of the ROI 220 within the FOV 210.

Figure 3:
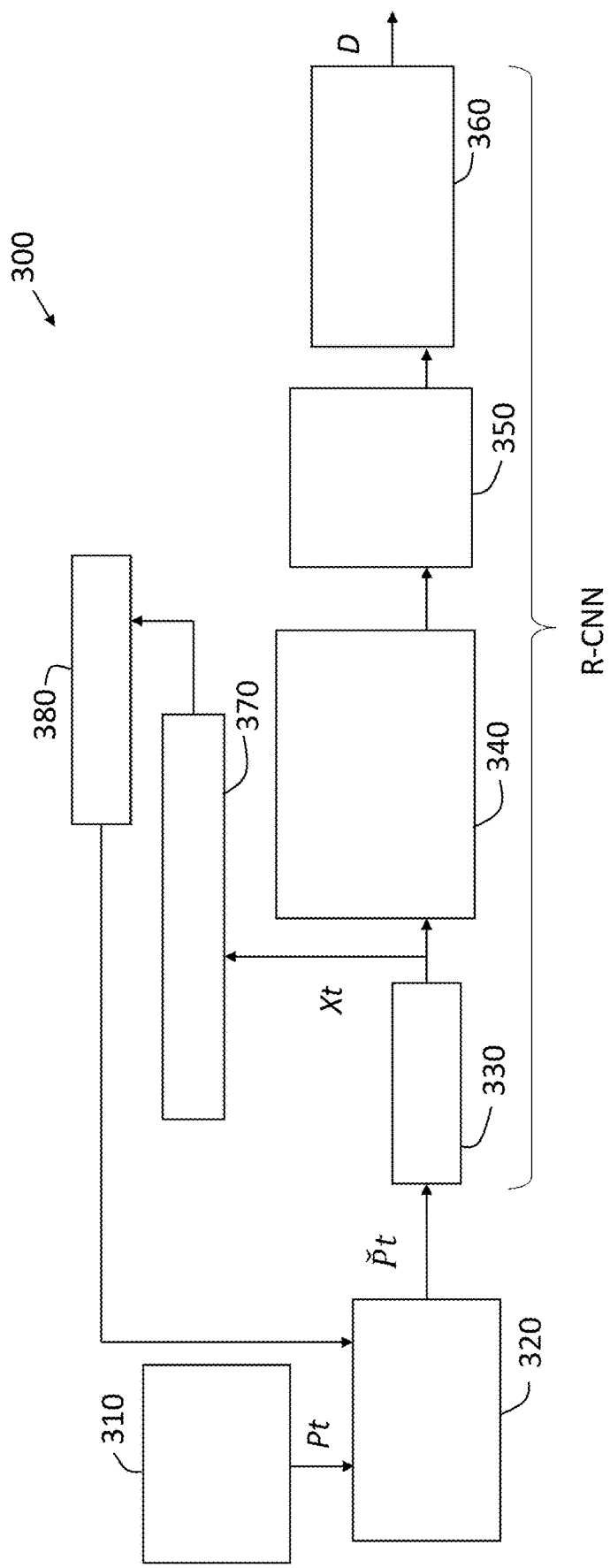
FIG. 3 is a process flow of a method of performing a neural network-based dual density point cloud generation in a lidar system of a vehicle according to one or more embodiments.

FIG. 3 is a process flow of a method 300 of performing a neural network-based dual density point cloud generation in a lidar system 110 of a vehicle 100 according to one or more embodiments. At block 310, the processes include obtaining the initial point cloud $P_t$ that is generated within the lidar system 110. The initial point cloud $P_t$ has a uniform density of points throughout the FOV 210. At block 320, reducing the density of the initial point cloud $P_t$ in areas outside the ROI 220 produces a dual density point cloud $\check{P}_t$. The percentage by which point density is reduced in areas of the FOV 210 that are outside the ROI 220 may be fixed (e.g., 20 percent). This dual density point cloud $\check{P}_t$ is further processed using a neural network according to known processes (at blocks 330-360) to obtain a detection result D that indicates detected objects and lanes around the vehicle 100. The neural network may be a region-based convolutional neural network (R-CNN), for example.

At block 330, implementing the encoder/decoder stage of the neural network results in the dual density point cloud $\check{P}_t$ points being mapped to lower-level representations. The decoder layers then perform up-sampling and generate point-wise feature vectors $X_t$. The point-wise vectors refers to the fact that a vector is generated per point of the dual density point cloud $\check{P}_t$ points. For example, for each of N points in the dual density point cloud $\check{P}_t$, an N×M matrix may be generated or, put another way, an M-length vector (e.g., M=128) may generated for each point as part of the point-wise feature vectors $X_t$. At block 340, generating three-dimensional proposals refers to the fact that each point is classified as a foreground point or a background point. At block 340, a three-dimensional region is generated as a proposal for an object associated with each foreground point. At block 350, processes performed by the neural network include pooling the point cloud regions. Region pooling refers to combining the three-dimensional region proposals that correspond to the same object. At block 360, refining three-dimensional bounding boxes results in the detection of objects and lanes in the FOV 210. The detection result D from block 360 may be provided to the vehicle controller 140 to affect an operation of the vehicle 100.

At block 370, implementing the other neural network refers to implementing a Deep Q-Network (DQN). The point-wise feature vectors $X_t$ from the encoder/decoder (at block 330) are also provided to the DQN, as shown in FIG. 3. The DQN estimates a Q value for each possible action a based on weights θ. The result is a matrix $A_t$ whose size is the same as the unit size of the set of potential centers 230 (e.g., 19-by-11 according to the exemplary case shown in FIG. 2). That is, each action a is the selection of one of the set of potential centers 230 as the center 235 of the ROI 220. At block 380, determining the ROI 220 refers to determining the center 235 of the ROI 220 for the next point cloud $P_{t+1}$ output by the lidar system 110 at block 310 for the next frame.

According to an exemplary embodiment, the matrix $A_t$, output from block 370, includes a predicted reward associated with each position within the set of potential centers 230. In this case, determining ROI 220, at block 380, involves determining which of the set of potential centers 230 is associated with the highest predicted reward, according to the matrix $A_t$. According to another exemplary embodiment, the matrix $A_t$, output from block 370, includes a probability associated with each position within the set of potential centers 230. In this case, determining ROI 220 for the next point cloud $P_{t+1}$, at block 380, involves determining which of the set of potential centers 230 is associated with the highest probability of producing a positive reward, according to the matrix $A_t$. According to this embodiment, referred to as a policy gradient, the DQN implements an additional softmax layer to obtain the probability of producing a positive reward. The reward is further discussed with reference to FIG. 4.

According to an exemplary embodiment, the DQN implemented at block 370 may be simplified by splitting the x and y dimensions. That is, instead of one Q value for each grid point in the FOV 210 that may act as the center 235 of the ROI 220, a Qx and a Qy may separately be determined by two branches of DQN at block 370. Then an $Ax_t$ and an $Ay_t$ may be output by the DQN.

Figure 4:
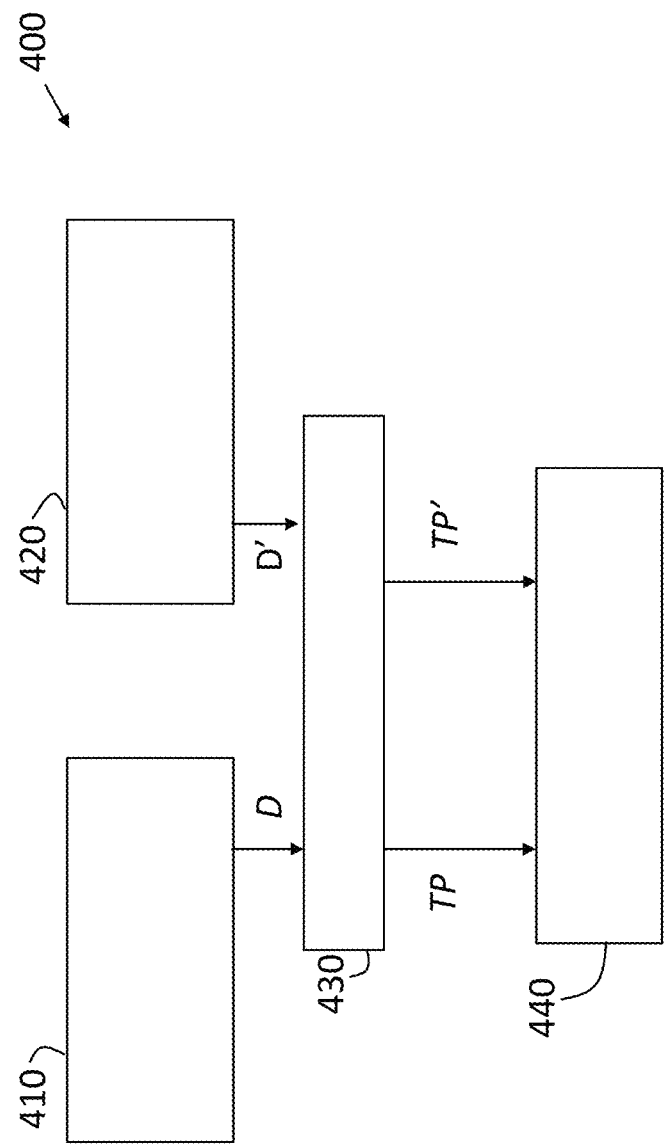
FIG. 4 is a process flow of aspects of a method of training the neural network that is implemented in the process flow shown in FIG. 3.

FIG. 4 is a process flow of aspects of a method 400 of training the DQN that is implemented at block 370 of FIG. 3. Training the DQN that is implemented at block 370 involves comparing the detection result D (output by block 360) that is obtained using the ROI 220 (at block 320) with ground truth and also comparing a detection result D' that would have been obtained if no dual density point cloud $\check{P}_t$ were used (i.e., with density of the initial point cloud $P_t$ reduced uniformly over the entire FOV 210) with ground truth. That is, the improvement in the detection result D that is obtained using the dual density point cloud $\check{P}_t$ over a detection result D' that is obtained without maintaining a higher point density in the ROI 220 is used to train the DQN.

At block 410, obtaining the detection result D at the output of block 360 is detailed with reference to FIG. 3. At block 420, obtaining the detection result D' involves using the same R-CNN discussed with reference to FIG. 3. However, instead of the input to the R-CNN (implemented at blocks 330-360) being the dual density point cloud $\check{P}_t$, the input is the initial point cloud $P_t$ with density reduced uniformly over the entire FOV 210. At block 430, comparing the detection result D with ground truth yields a number of true positives TP. The true positives refer to the number of detected objects in the detection result D that match ground truth. At block 430 comparing the detection result D' with ground truth yields a number of true positives TP' in the detection result D'.

At block 440, comparing the true positives TP obtained using the dual density point cloud $\check{P}_t$ with the true positives TP' obtained using the uniformly reduced point density provides the reward for the DQN. For example, if the true positives TP exceed the true positives TP' (i.e., the dual density point cloud $\check{P}_t$ yielded a more accurate detection result D), then the reward may be a positive value. If the true positives TP equal the true positives TP' (i.e., the dual density point cloud $\check{P}_t$ yielded the same accuracy as the uniformly reduced point density), then the reward may be zero. If the true positives TP are less than the true positives TP' (i.e., the dual density point cloud $\check{P}_t$ yielded a less accurate detection result D than using the uniformly reduced point density), then the reward may be a negative value. Training the DQN to maximize the reward is referred to as reinforcement learning.

This is the reward discussed with reference to the output of block 370. As previously noted, the output of block 370 may be the reward predicted based on each of the set of potential centers 230 being selected as the center 235 of the ROI 220 according to one exemplary embodiment. According to another exemplary (policy gradient) embodiment, the output of block 370 may be a probability that the reward is a positive value based on each of the set of potential centers 230 being selected as the center 235 of the ROI 220.

In addition to the reward, a loss may be used in training the DQN. The loss results from a comparison of predicted reward and actual reward. Thus, rather than using detection result D and detection result D' (as discussed for determination of reward), predicted reward at the output of the DQN is compared with actual reward. The larger the difference between predicted reward and actual reward, the larger the loss attributed to the DQN during training. Thus, the training process seeks to minimize the loss in addition to maximizing the reward.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle system comprising:
   a lidar system configured to obtain an initial point cloud, to obtain a dual density point cloud based on a first neural network and based on the initial point cloud, wherein the dual density point cloud results from reducing point density of the initial point cloud outside a region of interest (ROI), and to process the dual density point cloud to obtain a detection result that indicates any objects in a field of view (FOV) of the lidar system;
   wherein the first neural network is a Deep Q-Network (DQN) that obtains the point-wise feature vectors from an encoder and decoder stage of a second neural network, and wherein training the DQN includes comparing the detection result obtained with the dual density point cloud with a ground truth detection result to produce a number of true positives and comparing a second detection result obtained by reducing the point density of the initial point cloud throughout the FOV with the ground truth detection result to produce a second number of true positives; and
   a controller configured to obtain the detection result from the lidar system and to control an operation of a vehicle based on the detection result.

2. The vehicle system according to claim 1, wherein the lidar system is configured to implement the first neural network to define the ROI within the FOV that results in the dual density point cloud, the ROI being a region of fixed area with a center that is selected from a set of potential centers based on an output of the first neural network.

3. The vehicle system according to claim 2, wherein the lidar system is configured to implement a second neural network to output the detection result based on the dual density point cloud.

4. The vehicle system according to claim 3, wherein the second neural network includes an encoder and decoder stage configured to provide point-wise feature vectors such that each feature vector of the point-wise feature vectors is associated respectively with each point of the dual density point cloud.

5. A vehicle system comprising:
   a lidar system configured to obtain an initial point cloud, to obtain a dual density point cloud based on a first neural network and based on the initial point cloud, wherein the dual density point cloud results from reducing point density of the initial point cloud outside a region of interest (ROI), and to process the dual density point cloud to obtain a detection result that indicates any objects in a field of view (FOV) of the lidar system;
   the lidar system being configured to implement the first neural network to define the ROI within the FOV that results in the dual density point cloud, and configured to implement a second neural network to output the detection result based on the dual density point cloud, the second neural network including an encoder and decoder stage configured to provide point-wise feature vectors such that each feature vector of the point-wise feature vectors is associated respectively with each point of the dual density point cloud;
   the ROI being a region of fixed area with a center that is selected from a set of potential centers based on an output of the first neural network;
   wherein the first neural network is a Deep Q-Network (DQN) that obtains the point-wise feature vectors from the encoder and decoder stage of the second neural network, and wherein training the DQN includes comparing the detection result obtained with the dual density point cloud with a ground truth detection result to produce a number of true positives and comparing a second detection result obtained by reducing the point density of the initial point cloud throughout the FOV with the ground truth detection result to produce a second number of true positives; and
   a controller configured to obtain the detection result from the lidar system and to control an operation of a vehicle based on the detection result.

6. The vehicle system according to claim 5, wherein the training the DQN includes obtaining a reward by comparing the number of true positives with the second number of true positives, and the training the DQN includes maximizing the reward.

7. The vehicle system according to claim 6, wherein the DQN is configured to output a matrix indicating a predicted reward corresponding with each potential center among the set of potential centers.

8. The vehicle system according to claim 6, wherein the DQN is configured to output a matrix indicating a probability of a positive reward corresponding with each potential center among the set of potential centers.

9. The vehicle system according to claim 6, wherein the training the DQN includes obtaining a loss as a difference between the reward and a predicted reward provided by the DQN, and the training the DQN includes minimizing the loss.

10. A method comprising:
    obtaining, using a lidar system, an initial point cloud;
    implementing a first neural network, using the lidar system, to obtain a dual density point cloud based on the-first neural network and based on the initial point cloud, wherein the dual density point cloud results from reducing point density of the initial point cloud outside a region of interest (ROI), wherein implementing the first neural network results in defining the ROI within the FOV that results in the dual density point cloud, the ROI being a region of fixed area with a center that is selected from a set of potential centers based on an output of the first neural network, wherein the first neural network is a Deep Q-Network (DQN) and implementing the DQN includes obtaining point-wise feature vectors from an encoder and decoder stage of a second neural network;

implementing the second neural network to output the detection result based on the dual density point cloud, wherein the implementing the second neural network includes implementing the encoder and decoder stage to provide point-wise feature vectors such that each feature vector of the point-wise feature vectors is associated respectively with each point of the dual density point cloud;

training the DQN based on comparing the detection result obtained with the dual density point cloud with a ground truth detection result to produce a number of true positives and comparing a second detection result obtained by reducing the point density of the initial point cloud throughout the FOV with the ground truth detection result to produce a second number of true positives; and processing the dual density point cloud to obtain a detection result that indicates any objects in a field of view (FOV) of the lidar system.

11. The method according to claim 10, wherein the training the DQN includes obtaining a reward by comparing the number of true positives with the second number of true positives, and the training the DQN includes maximizing the reward, and the training the DQN additionally includes obtaining a loss as a difference between the reward and a predicted reward provided by the DQN, and the training the DQN includes minimizing the loss.

12. The method according to claim 11, wherein the implementing the DQN includes outputting a matrix indicating a predicted reward corresponding with each potential center among the set of potential centers.

13. The method according to claim 11, wherein the implementing the DQN includes outputting a matrix indicating a probability of a positive reward corresponding with each potential center among the set of potential centers.

14. The method according to claim 11, further comprising a vehicle controller obtaining the detection result from the lidar system and controlling an operation of a vehicle based on the detection result.

\* \* \* \* \*